United States Patent
Thommandram et al.

(10) Patent No.: US 11,443,365 B2
(45) Date of Patent: Sep. 13, 2022

(54) APPARATUS, SYSTEM AND METHOD FOR INTERACTIVE PACKAGING

(71) Applicant: Klick Inc., Toronto (CA)

(72) Inventors: Anirudh Thommandram, Toronto (CA); Yan Eric Fossat, Toronto (CA); Keith Liu, Toronto (CA)

(73) Assignee: KLICK INC., Toronto (CA)

( * ) Notice: Subject to any disclaimer, the term of this patent is extended or adjusted under 35 U.S.C. 154(b) by 483 days.

(21) Appl. No.: 16/542,482

(22) Filed: Aug. 16, 2019

(65) Prior Publication Data

US 2021/0049673 A1  Feb. 18, 2021

(51) Int. Cl.
| | |
|---|---|
| *G06Q 30/06* | (2012.01) |
| *G06F 3/147* | (2006.01) |
| *G06K 7/14* | (2006.01) |
| *G06F 3/0488* | (2022.01) |
| *H04B 1/38* | (2015.01) |
| *G06F 3/0482* | (2013.01) |
| *H04L 67/01* | (2022.01) |

(52) U.S. Cl.
CPC ......... *G06Q 30/0641* (2013.01); *G06F 3/147* (2013.01); *G06K 7/1413* (2013.01); *G06F 3/0482* (2013.01); *G06F 3/0488* (2013.01); *H04B 1/38* (2013.01); *H04L 67/42* (2013.01)

(58) Field of Classification Search
CPC ... G06Q 30/0641; G06F 3/147; G06F 3/0482; G06F 3/0488; G06K 7/1314
USPC ....................................................... 705/27.1
See application file for complete search history.

(56) References Cited

U.S. PATENT DOCUMENTS

| | | | |
|---|---|---|---|
| 6,753,830 B2 | 6/2004 | Gelbman | |
| 7,165,041 B1* | 1/2007 | Guheen | G06Q 30/04 |
| | | | 705/26.1 |
| 8,719,119 B1* | 5/2014 | Wargin | G06F 16/215 |
| | | | 705/30 |
| 9,239,722 B1* | 1/2016 | Calahan | G06F 8/34 |
| 2002/0190869 A1 | 12/2002 | Blotky et al. | |
| 2007/0051816 A1* | 3/2007 | Chu | G06K 19/077 |
| | | | 235/492 |
| 2007/0056871 A1 | 3/2007 | Griffiths et al. | |

(Continued)

FOREIGN PATENT DOCUMENTS

| | | |
|---|---|---|
| WO | 2011081780 A1 | 7/2011 |
| WO | 2016187001 A1 | 11/2016 |

OTHER PUBLICATIONS

"Multi-Purpose Safers", Sensormatic Solutions, Johnson Controls International plc, online product description, Jul. 5, 2017 <https://www.sensormatic.com/products/safers/adjustable-safers/multi-purpose-safers> (1 page).

*Primary Examiner* — William D Titcomb
(74) *Attorney, Agent, or Firm* — Bereskin & Parr LLP

(57) ABSTRACT

Apparatus, system and method for interactive packaging to determine purchase eligibility for a user are described. The apparatus may comprise a container for holding the product defined by an at least one wall; a display device attached to the at least one wall; and an input device attached to the at least one wall for receiving user input, and if the user input matches a predetermined value, presenting a purchase identifier. In some cases, the container is a removably locking anti-theft device that is removably attached to the product. In some cases, the display device is an electronic ink display.

16 Claims, 13 Drawing Sheets

(56) References Cited

U.S. PATENT DOCUMENTS

| | | | |
|---|---|---|---|
| 2011/0123198 A1* | 5/2011 | Nilsson | G06Q 30/00 |
| | | | 398/108 |
| 2011/0140844 A1 | 6/2011 | McGuire et al. | |
| 2016/0232480 A1* | 8/2016 | Erez | G06Q 30/0635 |
| 2017/0300925 A1* | 10/2017 | Atkinson | G09F 3/02 |
| 2018/0004472 A1* | 1/2018 | Sundholm | G06K 19/04 |
| 2019/0205120 A1* | 7/2019 | Sheedy | G06F 3/04842 |
| 2019/0294468 A1* | 9/2019 | Herring | G06F 9/4831 |
| 2019/0303862 A1* | 10/2019 | Bollinger | G06K 7/1413 |
| 2020/0042934 A1* | 2/2020 | Atkinson | G09G 5/40 |

\* cited by examiner

Questionnaire:
Q1 How old are you? [22 ▽]

FIG. 4D

Questionnaire:
Q1 How old are you? [22]
Q2 Duis varius vitae pretium sodales? ○

FIG. 4E

Questionnaire:
Q1 How old are you? [45]
Q2 Have you ever been diagnosed with high blood pressure?
◉ Yes  ◉ No  ◉ Unsure

FIG. 4F

APPARATUS, SYSTEM AND METHOD FOR INTERACTIVE PACKAGING

FIELD

The described embodiments relate to an apparatus, system and method for interactive packaging to determine purchase eligibility of a product for a user.

BACKGROUND

Many products available for purchase in stores are not suitable for all users. The packaging for such products includes information, often in small-print, used to determine purchase eligibility for a user. Purchase eligibility refers to whether a user meets a set of criteria for purchase of the product.

It is a challenge for some users to read all the information on a product package and determine if they meet the purchase eligibility criteria. There exists a desire for better packaging to aid in determining purchase eligibility for a user. It is challenging to determine purchase eligibility for a user because of the diversity in users, products and associated purchase eligibility criteria.

SUMMARY

In a first aspect, some embodiments provide an interactive product package for determining purchase eligibility for a user. The interactive product package comprises a container for holding the product defined by an at least one wall; a display device attached to the at least one wall; an input device attached to the at least one wall for receiving user input, and if the user input matches a predetermined value, presenting a purchase identifier.

In at least one embodiment, the container is removably attached to the product.

In at least one embodiment, the container is a removably locking anti-theft device.

In at least one embodiment, the display device is attached inside the at least one wall.

In at least one embodiment, the display device is attached outside the at least one wall.

In at least one embodiment, the display device is a liquid crystal display.

In at least one embodiment, the display device is an electronic ink display.

In at least one embodiment, the purchase identifier is a radio-frequency identifier.

In at least one embodiment, the purchase identifier is a barcode identifier.

In at least one embodiment, the interactive product package further comprises a sensor device for sensor input; and wherein the user input further comprises sensor input.

In at least one embodiment, the sensor device is a biometric sensor.

In at least one embodiment, the sensor device is a camera.

In another aspect, in accordance with the teachings herein, there is provided a method for determining product purchase eligibility for a user. The method comprises: displaying, at a display device, at least one purchase eligibility question to the user; validating, at a processor, the product purchase eligibility of the user, by, for each candidate eligibility question in the at least one purchase eligibility questions: receiving, at an input device, a user input selection corresponding to the candidate question; and comparing, at the processor, the user input selection to a corresponding predetermined value; if each user input selection matches the corresponding predetermined value: presenting a purchase identifier associated with the product.

In another aspect, in accordance with the teachings herein, there is provided an interactive product package system for determining purchase eligibility for a user comprising an input device; a display device; a memory comprising at least one purchase eligibility question; and a processor in communication with the input device, the display device, and the memory. The processor is configured to validate the product purchase eligibility of the user, by, for each candidate eligibility question in the at least one purchase eligibility questions: display, at the display device, the candidate question; receive, from the input device, a user input selection corresponding to the candidate question; and compare the user input selection to a corresponding predetermined value. If each user input selection matches the corresponding predetermined value, the processor is configured to present a purchase identifier associated with the product.

In another aspect, in accordance with the teachings herein, there is provided a method for determining product purchase eligibility for a user comprising: validating, at a processor, the purchase eligibility of the user based on an eligibility tree, by: displaying, at a display device, a candidate question to the user, the candidate question belonging to the eligibility tree; receiving, at an input device, a user input selection corresponding to the candidate question; comparing, at the processor, the user input selection to an expected answer; determining, based on the comparing, a next branch of the eligibility tree; determining, based on the next branch of the eligibility tree, a next candidate question; if each user input selection matches the corresponding predetermined value: presenting a purchase identifier associated with the product.

In another aspect, in accordance with the teachings herein, there is provided an interactive product package system for determining purchase eligibility for a user comprising: an input device; a display device; a memory comprising: an eligibility tree comprising at least one purchase eligibility question; a processor in communication with the input device, the display device, and the memory. The processor is configured to: validate the purchase eligibility of the user based on an eligibility tree, by: displaying, at the display device, a candidate question to the user, the candidate question belonging to the eligibility tree; receiving, from the input device, a user input selection corresponding to the candidate question; comparing the user input selection to an expected answer; determining based on the comparison, a next branch of the eligibility tree; determining based on the next branch of the eligibility tree, a next candidate question. If each user input selection matches the corresponding predetermined value, the processor is configured to present a purchase identifier associated with the product.

BRIEF DESCRIPTION OF THE DRAWINGS

A preferred embodiment will now be described in detail with reference to the drawings, in which:

FIG. 4D illustrates a user interface of an interactive product package in accordance with at least one embodiment;

FIG. 4E illustrates a user interface of an interactive product package in accordance with at least one embodiment;

FIG. 4F illustrates a user interface of an interactive product package in accordance with at least one embodiment;

DESCRIPTION OF EXAMPLE EMBODIMENTS

The present disclosure relates to an apparatus, system and method for an interactive product package for determining purchase eligibility for a user. The interactive product package can interact with a user by displaying one or more purchase eligibility questions to the user and receiving one or more corresponding purchase eligibility answers from the user. The received answer can be compared with a predetermined value to validate the purchase eligibility for the user.

Figure 1:
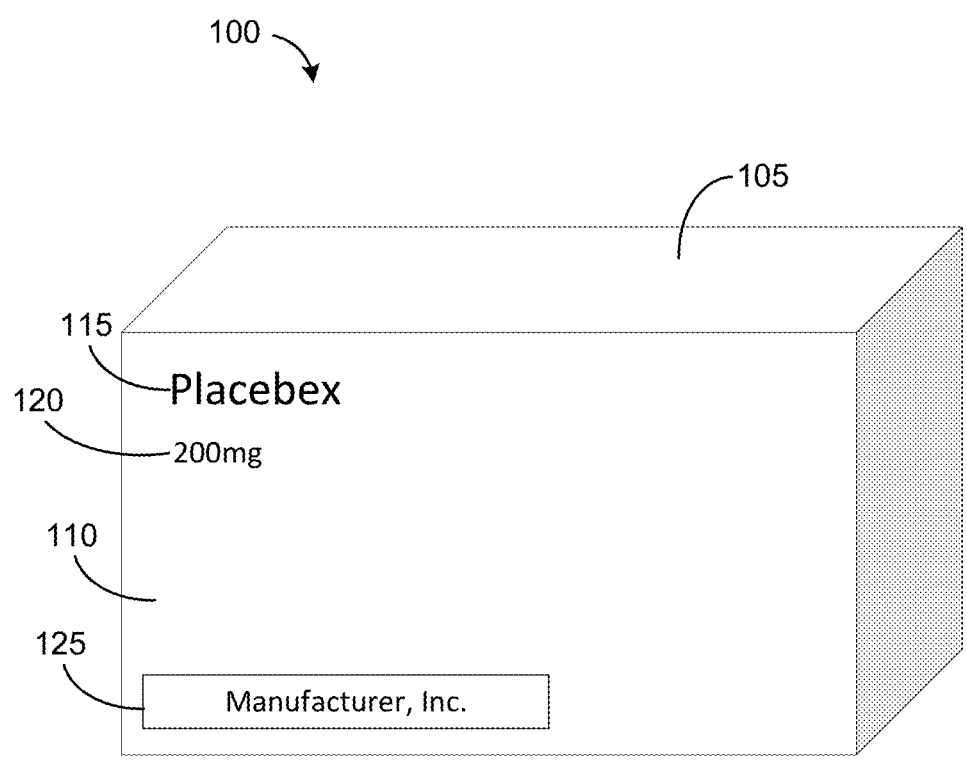
FIG. 1 is a front perspective view of an interactive product package in accordance with at least one embodiment.

Reference is first made to FIG. 1, which is a front perspective view of an interactive product package 100 in accordance with at least one embodiment. Interactive product package 100 includes a container 105 for holding the product. Container 105 is a rectangular, box-shaped container defined by six walls. In some embodiments, the container may be shaped differently and may be defined by a different number of walls, for example the package may be tubular, triangular, etc. A first wall 110 of container 105 includes information about the packaged product. For example, and without limitation, the information about the packaged product may include name of the product manufacturer, contact information of the product manufacturer, trademarks associated with the product, product name, product information, product lot number and product expiration date. As shown in FIG. 1, first wall 110 includes product manufacturer name 125, product name 115 and product quantity 120.

Figure 2A:
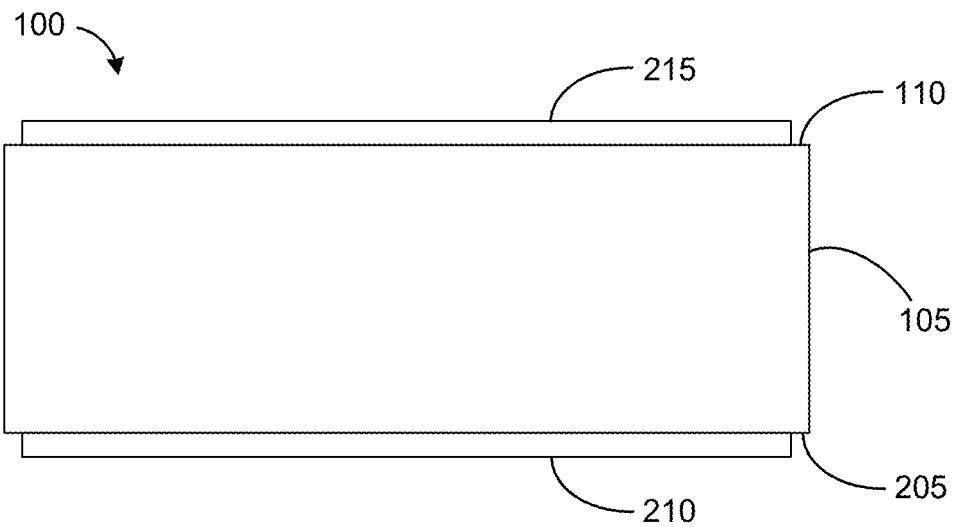
FIG. 2A is a top view of an interactive product package in accordance with at least one embodiment.

Reference is next made to FIG. 2A, which is a top view of an interactive product package 100 in accordance with at least one embodiment. Display device 215 is attached outside the first wall 110 of container 105 and display device 210 is attached outside a second wall 205 of container 105. In some embodiments, the display devices can be attached inside the walls of the container while remaining viewable and available for a user to interact with. In at least one embodiment, the interactive product package may comprise a single display device. As shown in FIG. 2A, second wall 205 of container 105 is opposite to first wall 110. In some embodiments, second wall 205 may be any other wall of the container. Display devices 210 and 215 can be digital display devices. For example, and without limitation, display devices 210 and 215 can be a liquid crystal display or an electronic ink display.

Figure 2B:
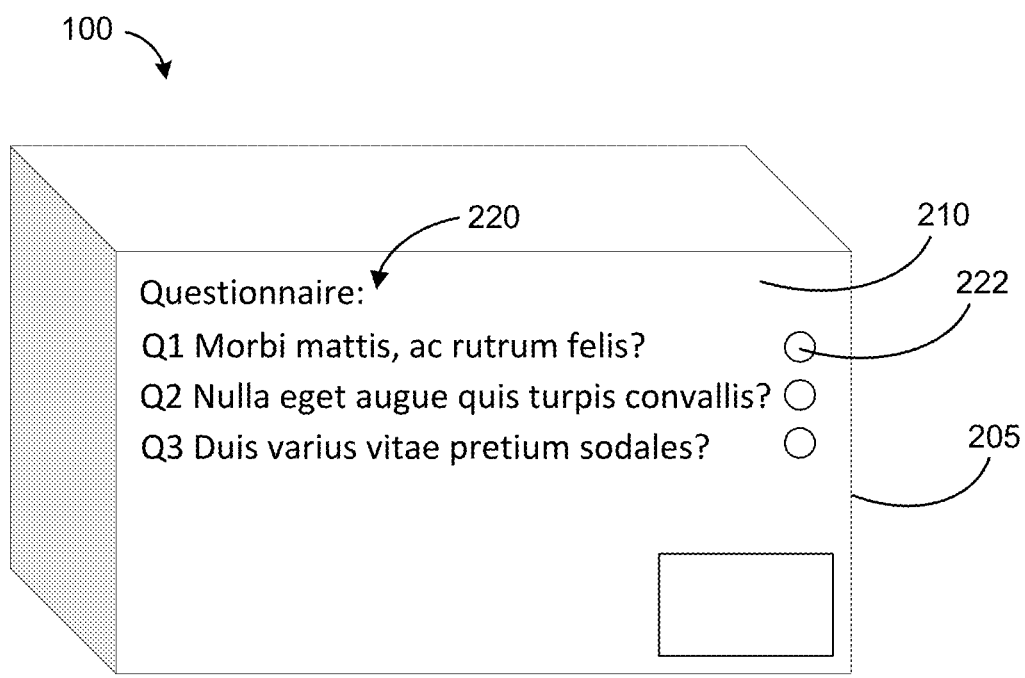
FIG. 2B is a rear perspective view of an interactive product package in accordance with at least one embodiment.

Reference is next made to FIG. 2B, which is a rear perspective view of an interactive product package 100 in accordance with at least one embodiment. One or more purchase eligibility questions 220 are displayed on display device 210 attached to second wall 205. Purchase eligibility questions 220 may be predetermined by the manufacturer of the product or a regulatory agency. The purchase eligibility questions 220 may have a corresponding user input 222 for a user to answer the question. The user input 222 may be a user input region 222 that is a touch sensitive region on the display device 210, or the user input 222 may be a separate device from the display device.

Where the user inputs 222 are separate devices, they may be devices such as buttons, touch sensors, capacitive sensors biometric sensors, colour sensors, light sensors, cameras, etc.

In some embodiments, interactive product package 100 can use a communication network to receive purchase eligibility questions 220 from a server.

In some embodiments, purchase eligibility questions 220 may comprise instructions or comments. For example, and without limitation, an instruction to a user to provide a biometric input using a biometric sensor of interactive product package 100 (as further described with reference to FIG. 6) or a comment to the user to acknowledge risks associated with the packaged product.

Figure 3A:
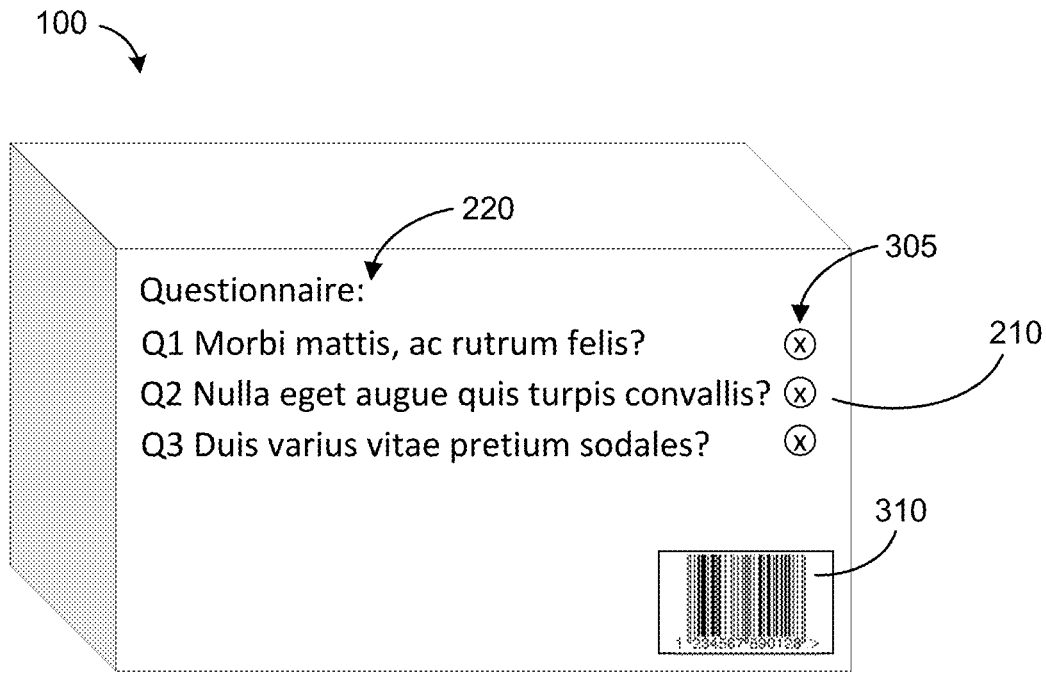
FIG. 3A is a rear perspective view of an interactive product package in accordance with at least one embodiment.

Reference is next made to FIG. 3A, which is a rear perspective view of an interactive product package 100 in accordance with at least one embodiment. Interactive product package 100 can receive a user answer input 305 in response to purchase eligibility questions 220 (as further described with reference to FIGS. 4A-4F). If received user input 305 matches a predetermined value, interactive product package 100 can present a purchase identifier 310. As shown in FIG. 3A, purchase identifier 310 can be a barcode identifier displayed on display device 210. The appearance of the barcode identifier can enable purchase of the product at a point-of-sale (POS) terminal.

Figure 3B:
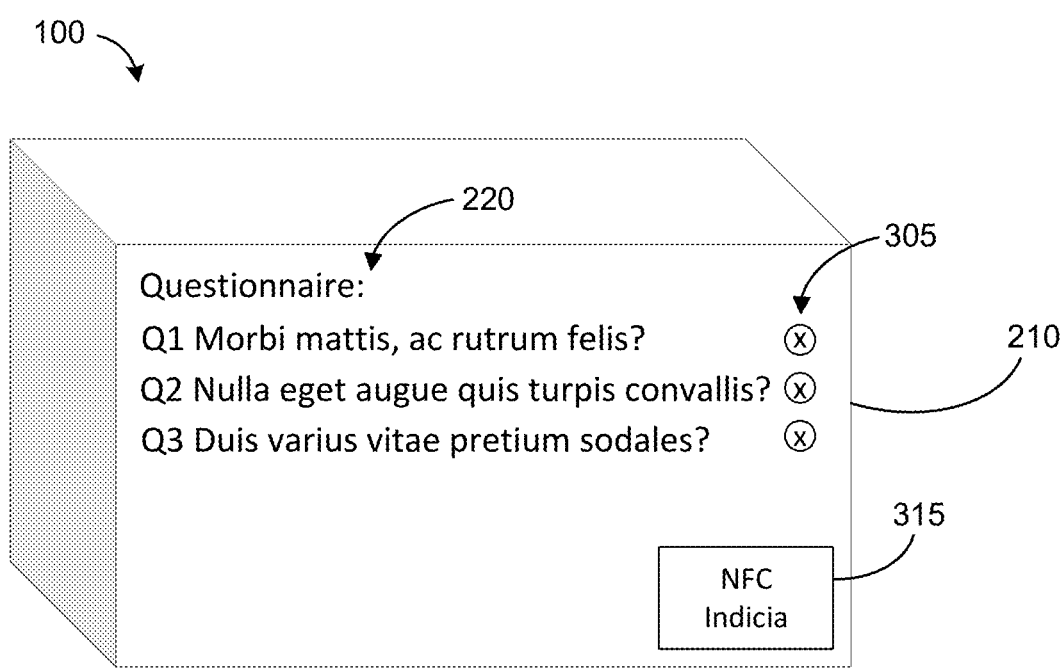
FIG. 3B is a rear perspective view of an interactive product package in accordance with at least one embodiment.

Reference is next made to FIG. 3B, which is a rear perspective view of an interactive product package 100 in accordance with at least one embodiment. As described above with reference to FIG. 3A, interactive product package 100 can present a purchase identifier 310 if received user input 305 matches a predetermined value. In some embodiments, interactive product package 100 may include a radio-frequency transceiver and interactive product package 100 presents purchase identifier 310 by transmitting a radio-frequency identifier. As shown in FIG. 3B, interactive product package 100 can present Near-Field Communication (NFC) indicia 315 corresponding to the transmitted radio-frequency identifier. The transmitted radio-frequency identifier can enable purchase of the product at a point-of-sale (POS) terminal.

Figure 4A:
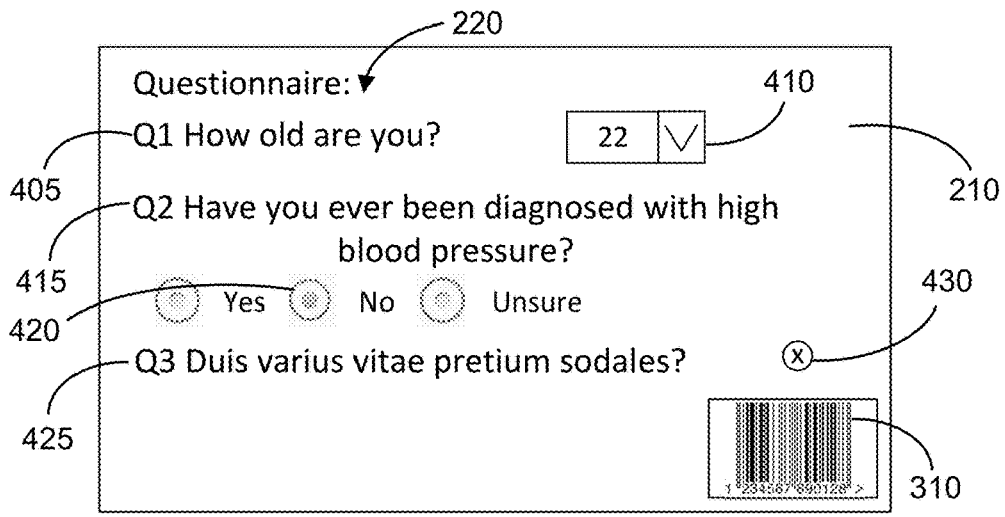
FIG. 4A illustrates a user interface of an interactive product package in accordance with at least one embodiment.

Reference is next made to FIG. 4A illustrating a user interface of an interactive product package in accordance with at least one embodiment. The one or more purchase eligibility questions 220 comprise eligibility questions 405, 415 and 425 that are displayed on display device 210. The interactive product package can receive user input comprising user input selections 410, 420 and 430 from an input device attached to a wall of the interactive product package. Display device 210 includes a touchscreen interface to receive user input. In some embodiments, the user input may include an audio input and the input device can include a microphone to receive the audio input. As shown in FIG. 4A, the interactive product package can receive user input selection 410 based on a user's drop-down menu selection. The interactive product package can receive user input selection 420 based on a user's selection from one of multiple radio buttons and receive user input selection 430 based on a user's checkbox selection. The interactive product package can compare the user input selections to corresponding predetermined values. If each user input selection matches the corresponding predetermined value, the interactive product package can present purchase identifier 310 on display device 210.

Figure 4B:
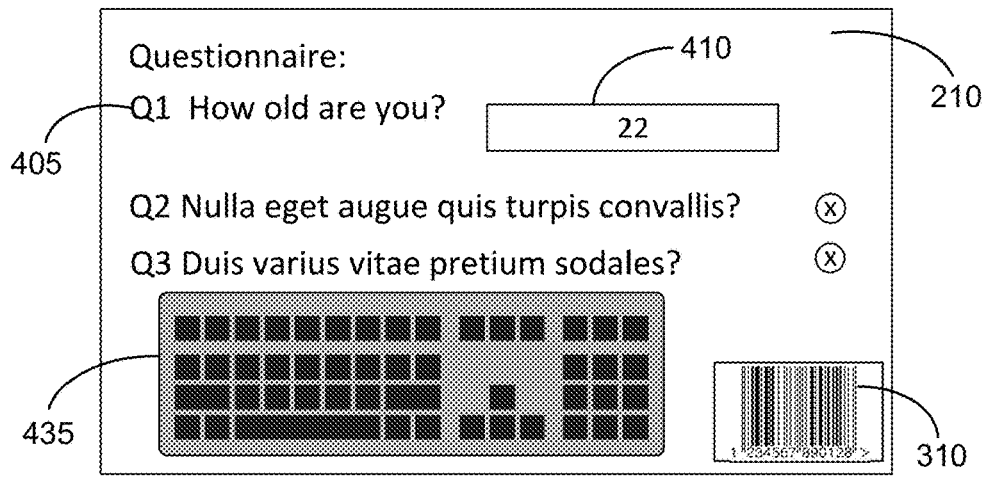
FIG. 4B illustrates a user interface of an interactive product package in accordance with at least one embodiment.

Reference is next made to FIG. 4B illustrating a user interface of an interactive product package in accordance with at least one embodiment. The interactive product package displays eligibility question 405 on display device 210 and receives user input comprising user input selection 410. As shown in FIG. 4B, the touchscreen interface of display device 210 includes a keyboard 435 to receive user input comprising user input selection 410. As described above with reference to FIG. 3A-3B, if each user input selection matches the corresponding predetermined value, the interactive product package can present purchase identifier 310 on display device 210.

Figure 4C:
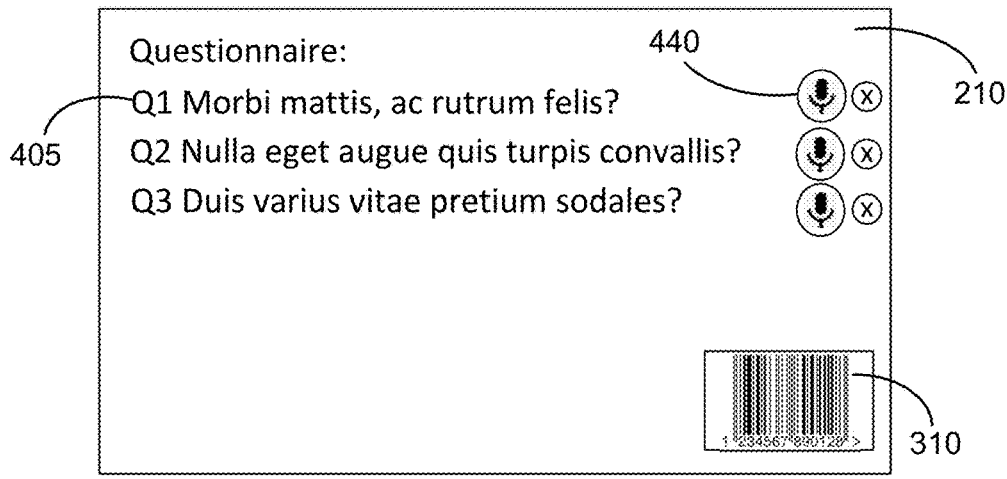
FIG. 4C illustrates a user interface of an interactive product package in accordance with at least one embodiment.

Reference is next made to FIG. 4C illustrating a user interface of an interactive product package in accordance with at least one embodiment. The interactive product package displays candidate eligibility question 405 on display device 210. A user can select an icon 440, corresponding to audio input, displayed on the touchscreen interface of display device 210. The interactive product package can include a microphone to receive the audio input from the user. As described above with reference to FIGS. 4A and 4B, if each user input selection matches the corresponding predetermined value, the interactive product package can present purchase identifier 310 on display device 210.

Reference is next made to FIG. 4D illustrating a user interface of an interactive product package in accordance with at least one embodiment. The interactive product package can determine the purchase eligibility of the user based on an eligibility tree. The interactive product package displays a candidate eligibility question 445 belonging to the eligibility tree on display device 210. The interactive product package receives user input comprising user input selection 450 corresponding to candidate eligibility question 445.

Reference is next made to FIGS. 4E and 4F illustrating user interfaces of an interactive product package in accordance with at least one embodiment. The interactive product package can compare the received candidate answer (described with reference to FIG. 4D above) to an expected answer and based on the comparison, determine a next branch of the eligibility tree. The interactive product package can display a next candidate eligibility question based on the determination of the next branch of the eligibility tree. As shown in FIG. 4E, the interactive product package receives user input selection 450 and displays next candidate eligibility question 455. In FIG. 4F, the interactive product package receives user input selection 460 and displays next candidate eligibility question 465.

Figure 5A:
FIG. 5A is a front perspective view of an interactive product package in accordance with at least one embodiment.

Reference is next made to FIG. 5A, which is a front perspective view of an interactive product package 500 in accordance with at least one embodiment. Interactive product package 500 includes a container 505 removably attached to product 530. In some embodiments, container 505 is a removably locking anti-theft device that may be unlocked and removed at the time of purchase. As shown in FIG. 5A, container 505 is a rectangular, box-shaped container defined by six walls. In some embodiments, the container may be shaped differently and may be defined by a different number of walls. A first wall 510 of container 505 includes information about the packaged product. For example, and without limitation, the information about the packaged product may include name of the product manufacturer, contact information of the product manufacturer, trademarks, product name, product information, product lot number and product expiration date. As shown in FIG. 5A, first wall 510 includes product manufacturer name 525, product name 515 and product quantity 520.

Figure 5B:
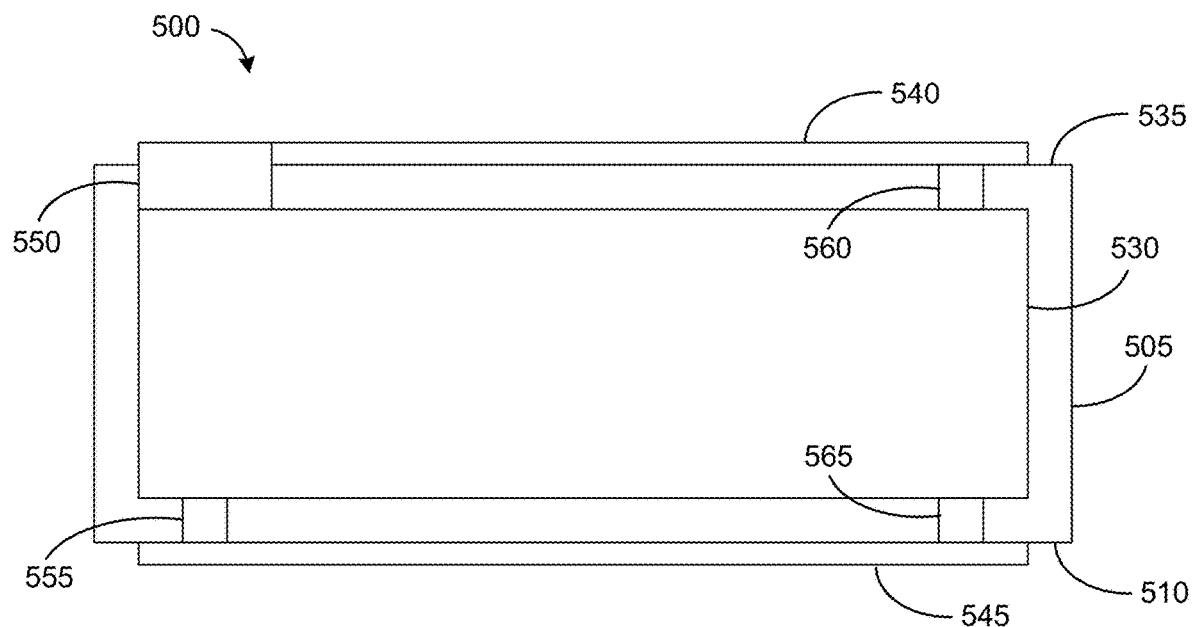
FIG. 5B is a top view of an interactive product package in accordance with at least one embodiment.

Reference is next made to FIG. 5B, which is a top view of an interactive product package 500 in accordance with at least one embodiment. Display device 545 is attached outside the first wall 510 of container 505 and display device 540 is attached outside a second wall 535 of container 505. In some embodiments, the display devices can be attached inside the walls of the container. In at least one embodiment, the interactive product package may comprise a single display device. As shown in FIG. 5B, second wall 535 of container 505 is opposite to first wall 510. In some embodiments, second wall 535 may be any other wall of the container. Display devices 540 and 545 can be digital display devices. For example, and without limitation, display devices 540 and 545 can be a liquid crystal display or an electronic ink display. In some embodiments, the interactive product package can include one or more coupling devices configured to removably attach the container to the product. The one or more coupling devices may include one or more locking devices. As shown in FIG. 5B, interactive product package 500 includes four coupling devices 550, 555, 560 and 565 to removably attach container 505 to product 530.

Figure 5C:
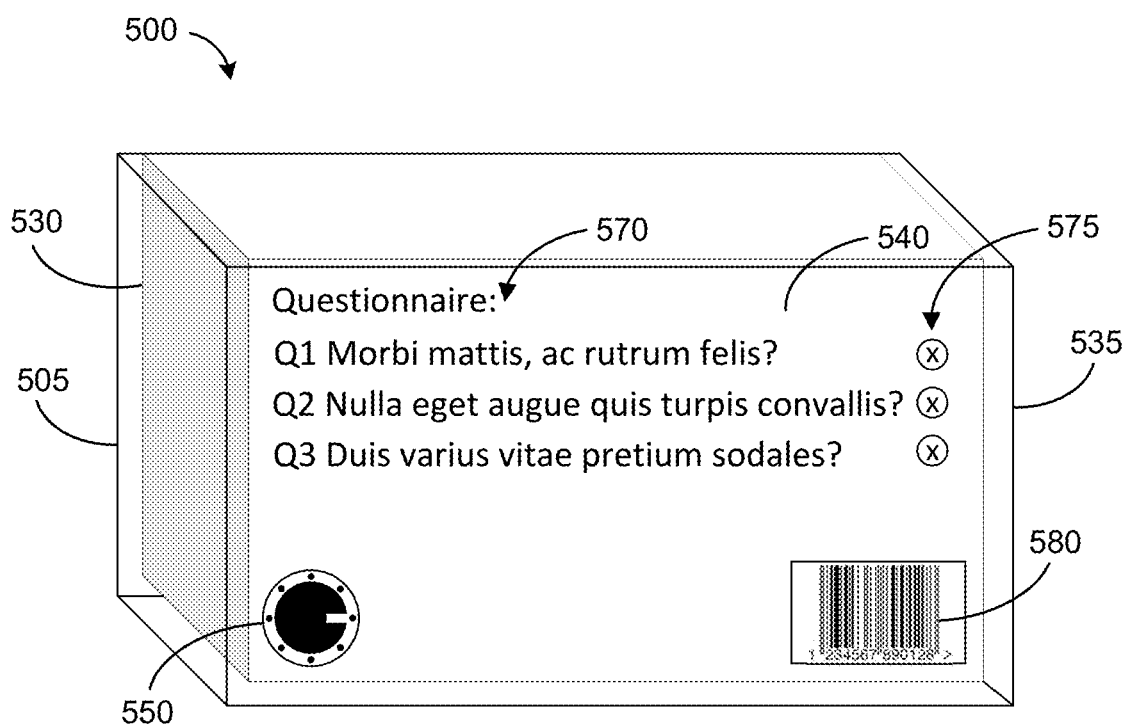
FIG. 5C is a rear perspective view of an interactive product package in accordance with at least one embodiment.

Reference is next made to FIG. 5C, which is a rear perspective view of an interactive product package 500 in accordance with at least one embodiment. Coupling device 550 includes a locking mechanism to enable anti-theft protection for product 530 in container 505. One or more purchase eligibility questions 570 are displayed on display device 540 attached to second wall 535. Purchase eligibility questions 570 may be predetermined by the manufacturer of the product or a regulatory agency. In some embodiments, interactive product package 500 can use a communication network to receive purchase eligibility questions 570 from a server. In some embodiments, purchase eligibility questions 570 may comprise instructions or comments. For example, and without limitation, an instruction to a user to provide a biometric input using a biometric sensor of interactive product package 500 or a comment to the user to acknowledge risks associated with the packaged product. A user who interacts with the interactive product package 500 may make multiple user input selections 575 as shown in FIGS. 4A-4F. The user input selections 575 may include Boolean values, text values, numeric data, image data, sound data, colour data, or any other type of user input as is known. Interactive product package 500 can receive a user input selection 575 in response to purchase eligibility questions 570. If received user input selection 575 matches a predetermined value, interactive product package 500 can present a purchase identifier 580. As shown in FIG. 5C, purchase identifier 580 can be a barcode identifier displayed on display device 540. The appearance of the barcode identifier can enable purchase of the product at a point-of-sale (POS) terminal. In some embodiments, interactive product package 500 may include a radio-frequency transceiver and interactive product package 500 presents purchase identifier 580 by transmitting a radio-frequency identifier.

Figure 6:
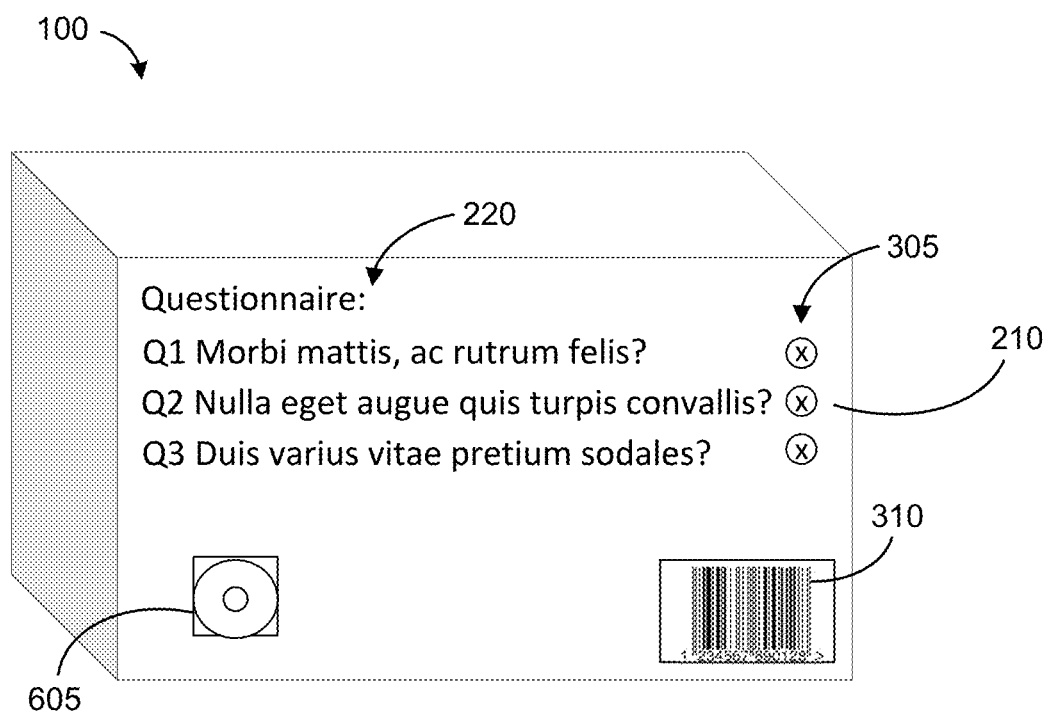
FIG. 6 is a rear perspective view of an interactive product package in accordance with at least one embodiment.

Reference is next made to FIG. 6, which is a rear perspective view of an interactive product package 100 in accordance with at least one embodiment. Interactive product package 100 displays purchase eligibility questions 220 on display device 210. In some embodiments, the interactive product package includes a sensor device for receiving sensor input. For example, and without limitation, the sensor device can include a biometric sensor 605 or a camera. As shown in FIG. 6, interactive product package 100 includes a biometric sensor 605. Interactive product package 100 can receive a user input 305, in response to purchase eligibility questions 220, using biometric sensor 605. If received user input 305 matches a predetermined value, interactive product package 100 can present a purchase identifier 310. As shown in FIG. 6, purchase identifier 310 can be a barcode identifier displayed on display device 210. The appearance of the barcode identifier can enable purchase of the product at a POS terminal. In some embodiments that include a radio-frequency transceiver, the interactive product package can receive user input using a near-field communication (NFC) protocol. For example, and without limitation, a user may provide user input by tapping their mobile device at an indicated location in response to a purchase eligibility question.

Figure 7:
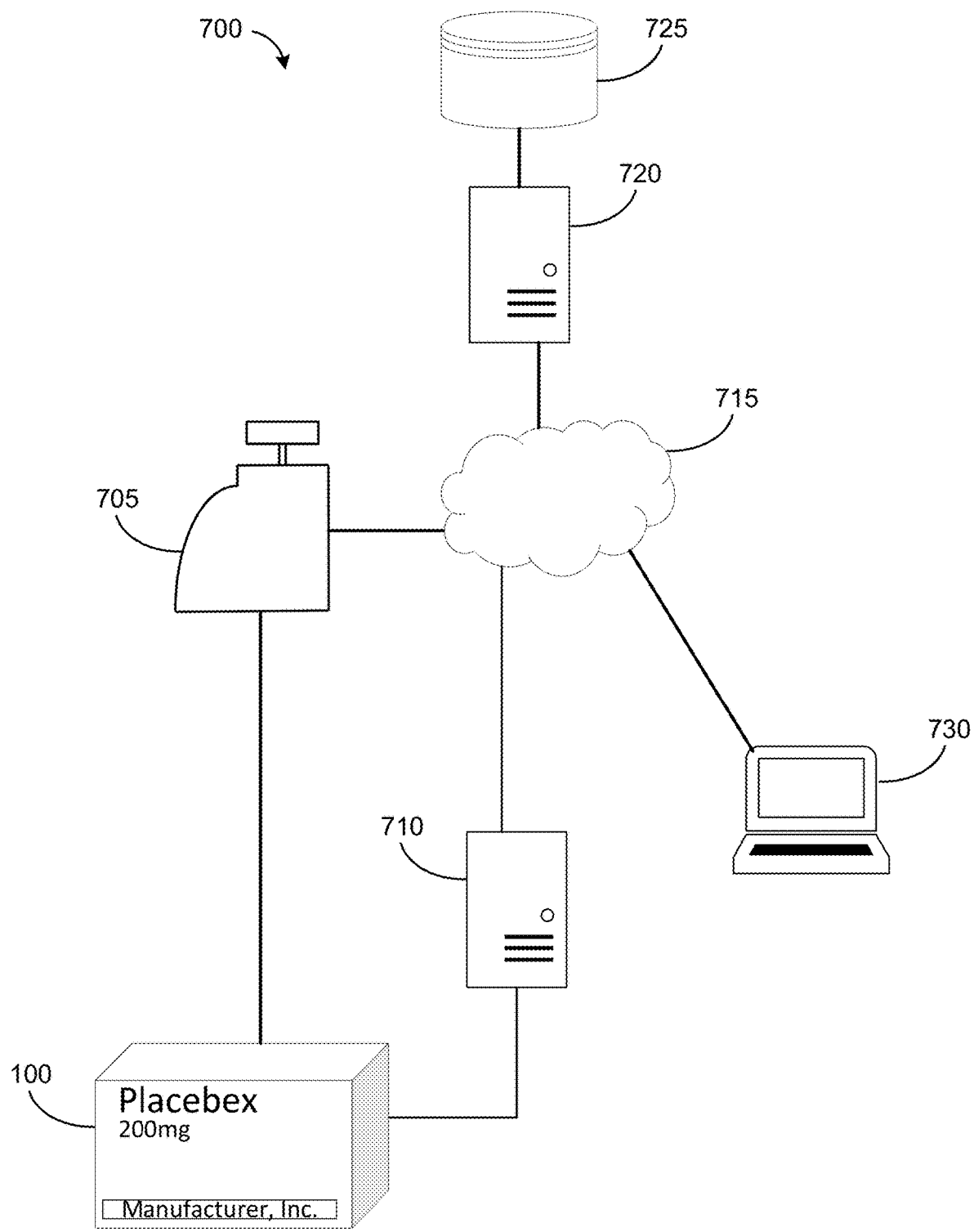
FIG. 7 is a diagram of a system for determining purchase eligibility for a user in accordance with an example embodiment.

Reference is next made to FIG. 7, which is a diagram of a system 700 for determining purchase eligibility for a user in accordance with an example embodiment. System 700 includes interactive product package 100, a POS device 705, servers 710 and 720, communication network 715, database 725, and operator device 730. Interactive product package 100 can display purchase eligibility questions and receive corresponding user input selections from an input device. In some embodiments, interactive product package 100 can receive one or more of the purchase eligibility questions from server 710 or server 720. If each user input selection matches a corresponding predetermined value, interactive product package 100 can present a purchase identifier associated with the product. The purchase identifier can enable purchase of the product at POS device 705. In some embodiments, interactive product package 100 can store an interaction history comprising the user input selections for one or more users in a memory unit and transmit the interaction history to POS device 705. The POS device 705 may transmit the interaction history to server 710 or server 720 using communication network 715. In some embodiments, server 720 can store received interaction history in database 725. An operator can provide input regarding purchase eligibility questions or predetermined values for user input selections using operator device 730 connected to communication network 715. In some embodiments, interactive product package 100 can display a secondary recommendation to the user if a user input selection matches a secondary predetermined value. For example, and without limitation, the secondary recommendation can include a secondary product recommendation or a recommendation to seek medical advice.

Figure 8:
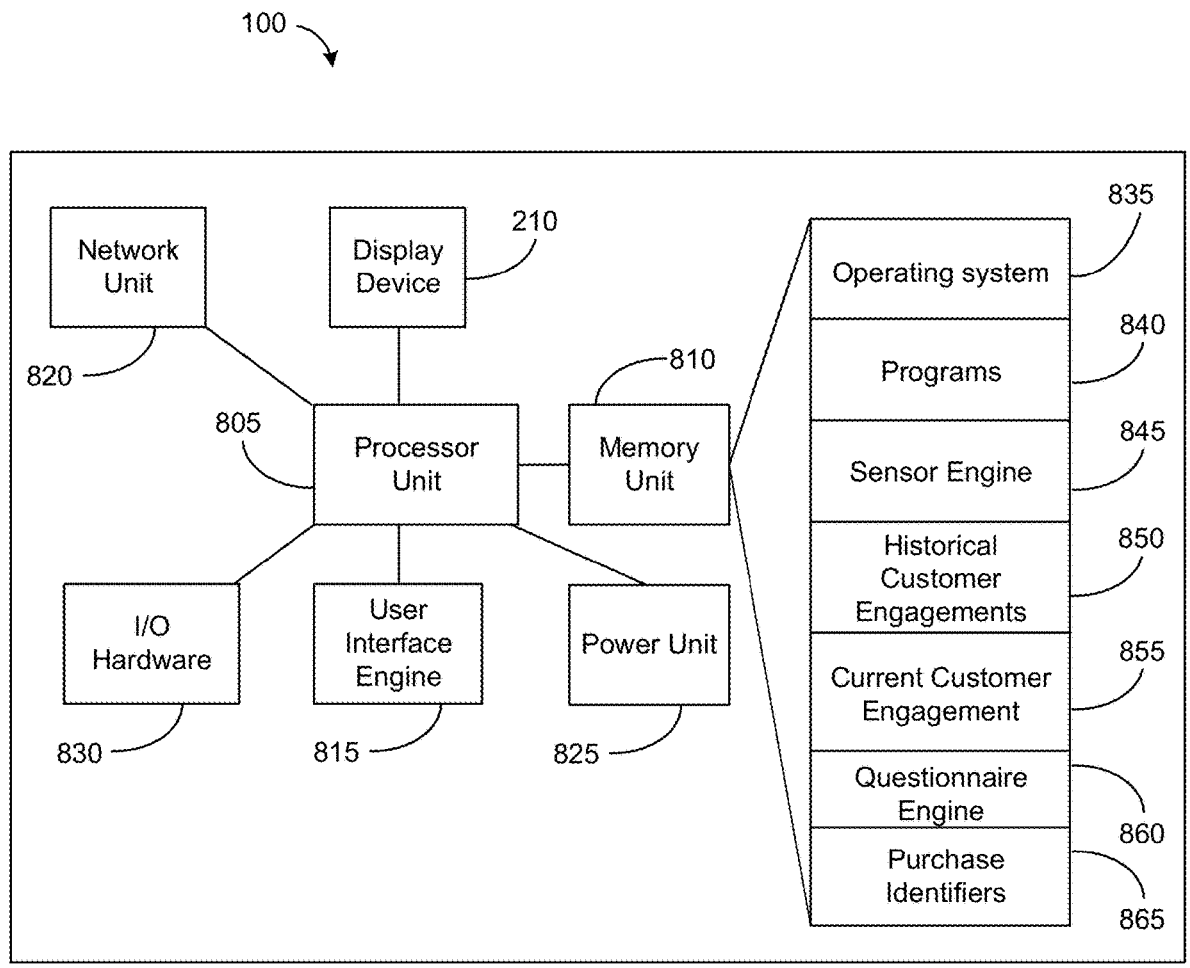
FIG. 8 is a component block diagram of an interactive product package in accordance with at least one embodiment.

Reference is next made to FIG. 8, which is a component block diagram of an interactive product package 100 in accordance with at least one embodiment. Interactive product package 100 includes processor unit 805, memory unit 810, user interface engine 815, network unit 820, power unit 825, I/O hardware 830, and display device 210. Memory unit 810 includes operating system 835, programs 840, sensor engine 845, historical customer engagements 850, current customer engagement 855, questionnaire engine 860 and purchase identifiers 865.

Questionnaire engine 860 of memory unit 810 can provide one or more purchase eligibility questions to processor unit 805. In some embodiments, network unit 820 can enable processor unit 805 to communicate with a server (for example, server 710 or server 720 shown in FIG. 7) to retrieve one or more purchase eligibility questions and store the received questions in memory unit 810. Network unit 820 may use a wireless communication protocol, for example, a Bluetooth® connection to communicate with the servers. In some embodiments, interactive product package 100 can be placed into a docking station to transfer purchase eligibility questions from the server to interactive product package 100.

User interface engine 815 can enable processor unit 805 to display the purchase eligibility questions on display device 210. For example, processor unit 805 can display purchase eligibility questions 220 comprising eligibility questions 405, 415, and 425, as shown in FIG. 4A, on display device 210. Processor unit 805 can receive user input selections corresponding to the eligibility questions from an input device included in I/O hardware 830. Processor unit 805 can validate the product purchase eligibility of a user by comparing the user input selections to corresponding predetermined values stored in memory unit 810. If each user input selection matches the corresponding predetermined value, processor unit 805 can present a purchase identifier stored in purchase identifier 865 of memory unit 810 associated with the product. In some embodiments, the purchase identifier is a bar code identifier and processor unit 805 presents the purchase identifier by displaying the barcode identifier on display device 210 (for example, purchase identifier 310 shown in FIG. 4A). In other embodiments, I/O hardware 830 includes a radio-frequency transceiver and processor unit 805 presents the purchase identifier by transmitting a radio-frequency identifier using the radio-frequency transceiver.

In some embodiments, processor unit 805 can validate the purchase eligibility of a user based on an eligibility tree, comprising one or more purchase eligibility questions, stored in memory unit 810. User interface engine 815 can enable processor unit 805 to display a candidate question belonging to the eligibility tree at display device 210. For example, processor unit 805 can display candidate eligibility question 445, as shown in FIG. 4D, on display device 210.

Processor unit 805 can receive a user input selection corresponding to the eligibility questions from an input device included in I/O hardware 830. For example, processor unit 805 can receive user input selection 450 from a touchscreen interface, as shown in FIG. 4D. Processor unit 805 can compare the received user input selection to an expected selection and determine, based on the comparison, a next branch of the eligibility tree. Processor unit 805 can determine a next candidate question based on the next branch of the eligibility tree. For example, processor unit 805 can receive user input selection 450 and based on the comparison determine the next branch of the eligibility tree. As shown in FIG. 4E, based on the determined next branch of the eligibility tree, processor unit 805 can determine the next candidate question 455 and display it on display device 210. In contrast, processor unit 805 may receive user input selection 460 and based on the comparison determine the next branch of the eligibility tree. As shown in FIG. 4F, based on the determined next branch of the eligibility tree, processor unit 805 can determine the next candidate question 465 and display it on display device 210. In some embodiments, network unit 820 can enable processor unit 805 to transmit a received user input selection corresponding to the candidate eligibility question to a server and receive the next branch of the eligibility tree from the server. For example, processor unit 805 can transmit a received user input selection corresponding to the candidate eligibility question to server 710 or server 720 of FIG. 7 and receive the next branch of the eligibility tree from the server.

Processor unit 805 can validate the product purchase eligibility of a user by comparing the received user input selections to corresponding predetermined values stored in memory unit 810. If each user input selection matches the corresponding predetermined value, processor unit 805 can present a purchase identifier stored in purchase identifier 865 of memory unit 810 associated with the product. In some embodiments, the purchase identifier is a barcode identifier and processor unit 805 presents the purchase identifier by displaying the barcode identifier on display device 210 (for example, purchase identifier 310 shown in FIG. 4A). The purchase identifier may be a 1-dimensional barcode identifier such as a Universal Product Code (UPC), or a European Article Number (EAN) displayed for scanning at a POS terminal. In another embodiment, the purchase identifier may be a 2-dimensional barcode identifier such as a Aztec code, a Quick Response (QR) code, or another 2-dimensional barcode displayed for scanning at a POS terminal. In other embodiments, I/O hardware 830 includes a radio-frequency transceiver and processor unit 805 presents the purchase identifier by transmitting a radio-frequency identifier using the radio-frequency transceiver.

In some embodiments, processor unit 805 stores interaction history comprising the user input selections in current customer engagement 855 of memory unit 810. Memory unit 810 can also include historical customer engagements 850 to store interaction history comprising the user input selections of multiple users. At the time of purchase, processor unit 805 can transmit the stored user interaction history to a POS terminal (for example, POS terminal 705 of FIG. 7). This may be done by encoding the current customer engagement 855 into the purchase identifier 865 in addition to a product identifier, such as in a 2-dimensional barcode representation of the purchase identifier. In one embodiment both the current customer engagement 855 and the historical customer engagements 850 may be encoded into the purchase identifier 865, including in a 2-dimensional barcode representation for display on display device 210 (for example, purchase identifier 310 shown in FIG. 4A). The current customer engagement 855 and the historical customer engagements 850 may be decoded by the POS terminal and transmitted to a server (for example, server 710 or server 720 in FIG. 7). In some embodiments, network unit 820 can enable processor unit 805 to transmit the stored user interaction history (both the current and historical user interactions) to a server (for example, server 710 or server 720 of FIG. 7).

In some embodiments, the processor 805 may select from different purchase identifiers 865 to display on display device 210 (for example, purchase identifier 310 shown in FIG. 4A). The selection between different purchase identifiers 865 may be made to present a different identifier for the same product based on the candidate answers provided by a user. This may, for example, allow the processor 805 to select a lower price point for a user based on candidate answers. The lower price point may, for example, reflect a user redeeming a discount code that is entered as a candidate answer to a question. The lower price point may, for example, reflect a manufacturer discount for user's self-reporting particular medical conditions such as diabetes.

In some embodiments, I/O hardware 830 includes one or more sensors, for example, biometric sensors 605 shown in FIG. 6. Processor unit 805 can communicate with the sensors and receive sensor data from the sensors. Processor unit 805 can include the sensor data and interaction metadata based on user input selections in the stored interaction history.

Figure 9:
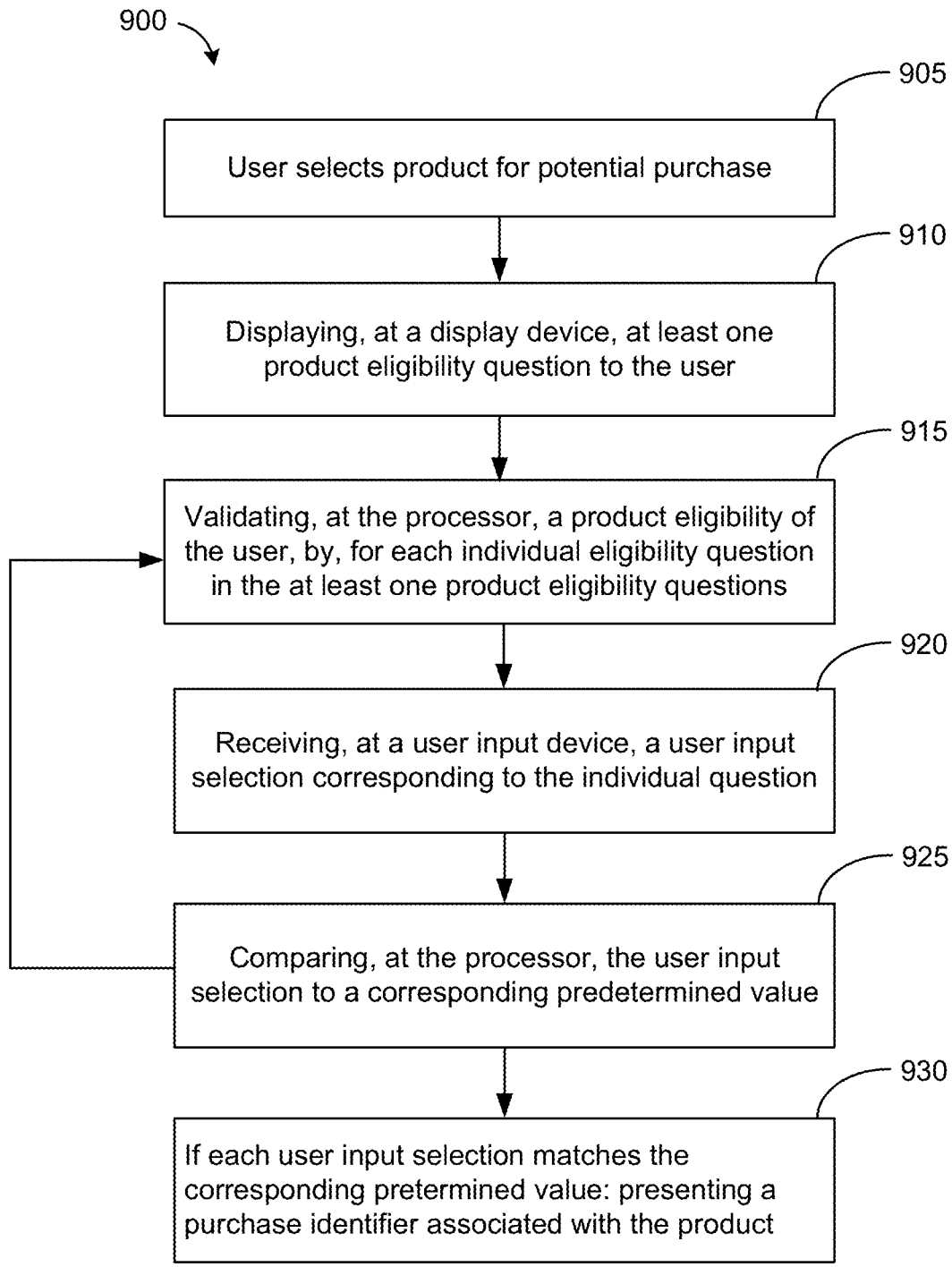
FIG. 9 is a flowchart diagram of an example embodiment of various methods of determining product purchase eligibility for a user.

Reference is next made to FIG. 9, which is a flowchart diagram of an example embodiment of method 900 of determining product purchase eligibility for a user. In at least one embodiment, method 900 can be performed by an interactive product package, for example interactive product package 100 described above. However, it should be noted that the method 900 can be modified for use with other systems or methods.

The method 900 begins at 905, where a user selects a product for potential purchase. The product may be contained inside interactive product package 100 shown in FIG. 1.

At 910, the method 900 moves to display, at a display device, at least one purchase eligibility question to the user. For example, interactive product package 100 can display purchase eligibility questions 220 on display device 210. In some embodiments, the method 900 moves to receive at least one purchase eligibility question from a server. For example, interactive product package 100 can communicate with server 710 or server 720 of FIG. 7 to receive one or more purchase eligibility questions.

At 915, the method 900 moves to validate purchase eligibility of the user by performing acts 920 and 925, described below, for each candidate eligibility question in the at least one purchase eligibility questions. In some embodiments, the validation of purchase eligibility of the user can be performed by processor unit 805 shown in FIG. 8.

At 920, the method 900 moves to receive, at a user input device, a user input selection corresponding to the candidate question. For example, interactive product package 100 can receive, at a touchscreen interface, user input selections 410 corresponding to the questions 405, as shown in FIG. 4A.

At 925, the method 900 moves to compare the received user input selection to a corresponding predetermined value. For example, processor unit 805, shown in FIG. 8, can validate the product purchase eligibility of a user by comparing the user input selections to corresponding predetermined values stored in memory unit 810.

At 930, the method 900 moves to present a purchase identifier associated with the product if each user input selection matches the corresponding predetermined value. In some embodiments, the purchase identifier is a barcode identifier, and presenting the purchase identifier comprises displaying the barcode identifier on the display device. For example, as shown in FIG. 3A, barcode identifier 310 is displayed on display device 210. In some embodiments, the purchase identifier is a radio-frequency identifier, and presenting the purchase identifier comprises transmitting the radio-frequency identifier using a radio-frequency transceiver. For example, I/O hardware 830 of FIG. 8 may include a radio-frequency transceiver and processor unit 805 presents the purchase identifier by transmitting a radio-frequency identifier using the radio-frequency transceiver. As shown in FIG. 3B, NFC indicia 310 corresponding to the radio-frequency identifier can be displayed on display device 210.

In some embodiments, the method 900 stores an interaction history comprising the one or more user input selections, received at 920, for one or more users. For example, interactive product package 100 can store interaction history comprising user input selections for one or more users in a memory unit. At 930, the method 900 can transmit the stored interaction history to a POS device. For example, interactive product package 100 can transmit the stored interaction history to POS terminal 705 of FIG. 7. In some embodiments, the stored interaction history comprises at least one of interaction metadata, and sensor data from one or more sensors. For example, interactive product package 100 may receive sensor data from biometric sensors 605 (shown in FIG. 6). Interactive product package 100 can include the sensor data and interaction metadata based on user input selections in the stored interaction history.

In some embodiments, at 930, the method 900 can display a secondary recommendation to the user if a user input selection matches a secondary predetermined value. For example, and without limitation, the secondary recommendation can include a secondary product recommendation or a recommendation to seek medical advice.

Figure 10:
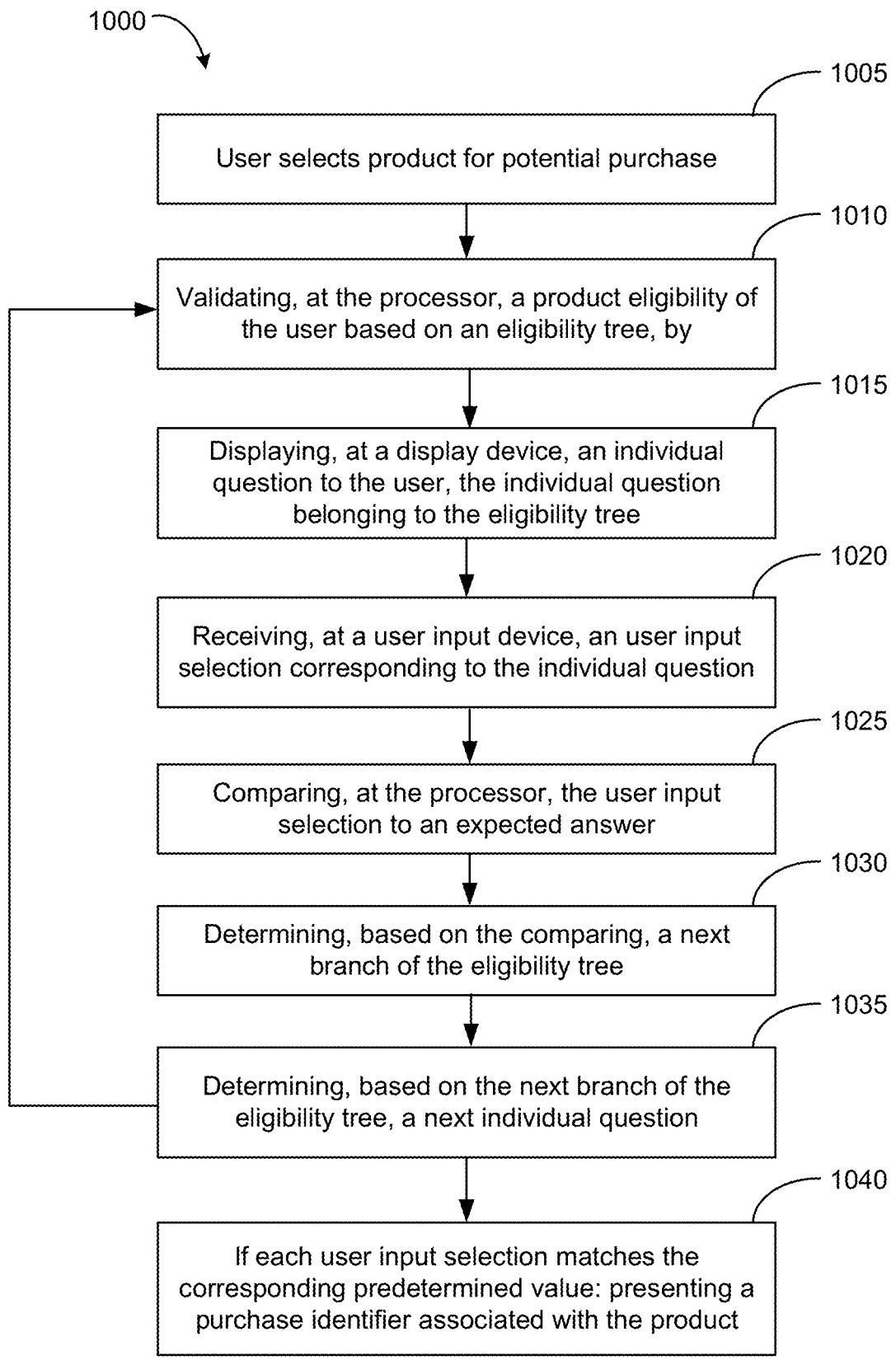
FIG. 10 is a flowchart diagram of an example embodiment of various methods of determining product purchase eligibility for a user.

Reference is next made to FIG. 10, which is a flowchart diagram of an example embodiment of method 1000 of determining product purchase eligibility for a user. In at least one embodiment, method 1000 can be performed by an interactive product package, for example interactive product package 100 described above. However, it should be noted that the method 1000 can be modified for use with other systems or methods.

The method 1000 begins at 1005, where a user selects a product for potential purchase. The product may be contained inside interactive product package 100 shown in FIG. 1.

At 1010, the method 1000 moves to validate purchase eligibility of the user based on an eligibility tree. Act 1010 may be performed by a processor, for example, processor unit 805 of interactive product package 100 shown in FIG. 8. The eligibility tree, comprising one or more purchase eligibility questions, may be stored in memory, for example, memory unit 810 of interactive product package 100 shown in FIG. 8. In some embodiments, the eligibility tree may be stored on a server, for example, server 710 or server 720 shown in FIG. 7.

At 1015, the method 1000 moves to display to the user, at a display device, a candidate question belonging to the eligibility tree. For example, interactive product package 100 can display candidate eligibility question 445, as shown in FIG. 4D, on display device 210.

At 1020, the method 1000 moves to receive, at a user input device, a user input selection corresponding to the candidate question. For example, interactive product package 100 can receive user input selection 450 from a touchscreen interface, as shown in FIG. 4D.

At 1025, the method 1000 moves to compare the received user input selection to an expected answer. For example, processor unit 805 can compare the received user input selection to an expected answer stored in memory unit 810, as shown in FIG. 8.

At 1030, the method 1000 moves to determining, based on the comparison in act 1025, a next branch of the eligibility tree. For example, interactive product package 100 can compare a user input selection 450 received at a touchscreen interface, as shown in FIG. 4D, and determine the next branch of the eligibility tree based on the comparison of user input selection 450 to an expected answer stored in memory unit 810 (shown in FIG. 8). In some embodiments, interactive product package 100 can transmit a received user input selection, corresponding to the candidate eligibility question, to a server and receive the next branch of the eligibility tree from the server. For example, interactive product package 100 can transmit a received user input selection, corresponding to the candidate eligibility question, to server 710 or server 720 (shown in FIG. 7) and receive the next branch of the eligibility tree from the server.

At 1035, the method 1000 moves to determine a next candidate question based on the next branch of the eligibility tree determined at 1030. For example, interactive product package 100 can receive user input selection 450 (as shown in FIG. 4D) and determine the next branch of the eligibility tree based on the comparison of user input selection 450 to an expected answer. Interactive product package 100 can determine the candidate question 455 (shown in FIG. 4E) based on the determined next branch of the eligibility tree. In contrast, interactive product package 100 may receive user input selection 460 (as shown in FIG. 4F) and determine the next branch of the eligibility tree based on the comparison of user input selection 460 to an expected answer. Interactive product package 100 can determine the candidate question 465 (shown in FIG. 4F) based on the determined next branch of the eligibility tree.

At 1040, the method 1000 moves to present a purchase identifier associated with the product if each user input selection matches the corresponding predetermined value. In some embodiments, the purchase identifier is a barcode identifier, and presenting the purchase identifier comprises displaying the barcode identifier on the display device. For example, as shown in FIG. 3A, barcode identifier 310 is displayed on display device 210. In some embodiments, the purchase identifier is a radio-frequency identifier, and presenting the purchase identifier comprises transmitting the radio-frequency identifier using a radio-frequency transceiver. For example, I/O hardware 830 of FIG. 8 may include a radio-frequency transceiver and processor unit 805 presents the purchase identifier by transmitting a radio-frequency identifier using the radio-frequency transceiver. As shown in FIG. 3B, NFC indicia 310 corresponding to the radio-frequency identifier can be displayed on display device 210.

In some embodiments, the method 1000 moves to store an interaction history comprising the one or more user input selections, received at 1020, for one or more users. For example, interactive product package 100 can store interaction history comprising user input selections for one or more users in a memory unit. At 1040, the method 1000 can transmit the stored interaction history to a POS device. For example, interactive product package 100 can transmit the stored interaction history to POS terminal 705 of FIG. 7. In some embodiments, the stored interaction history comprises at least one of interaction metadata, and sensor data from one or more sensors. For example, interactive product package 100 may receive sensor data from biometric sensors 605 (shown in FIG. 6). Interactive product package 100 can include the sensor data and interaction metadata based on user input selections in the stored interaction history. In some embodiments, the method 1000 moves to transmit the stored interaction history to a server. For example, interactive product package 100 can transmit the interaction history to server 710 or server 720 shown in FIG. 7.

In some embodiments, at 1040, the method 1000 moves to display a secondary recommendation to the user if a user input selection matches a secondary predetermined value. For example, and without limitation, the secondary recommendation can include a secondary product recommendation or a recommendation to seek medical advice.

Figure 11:
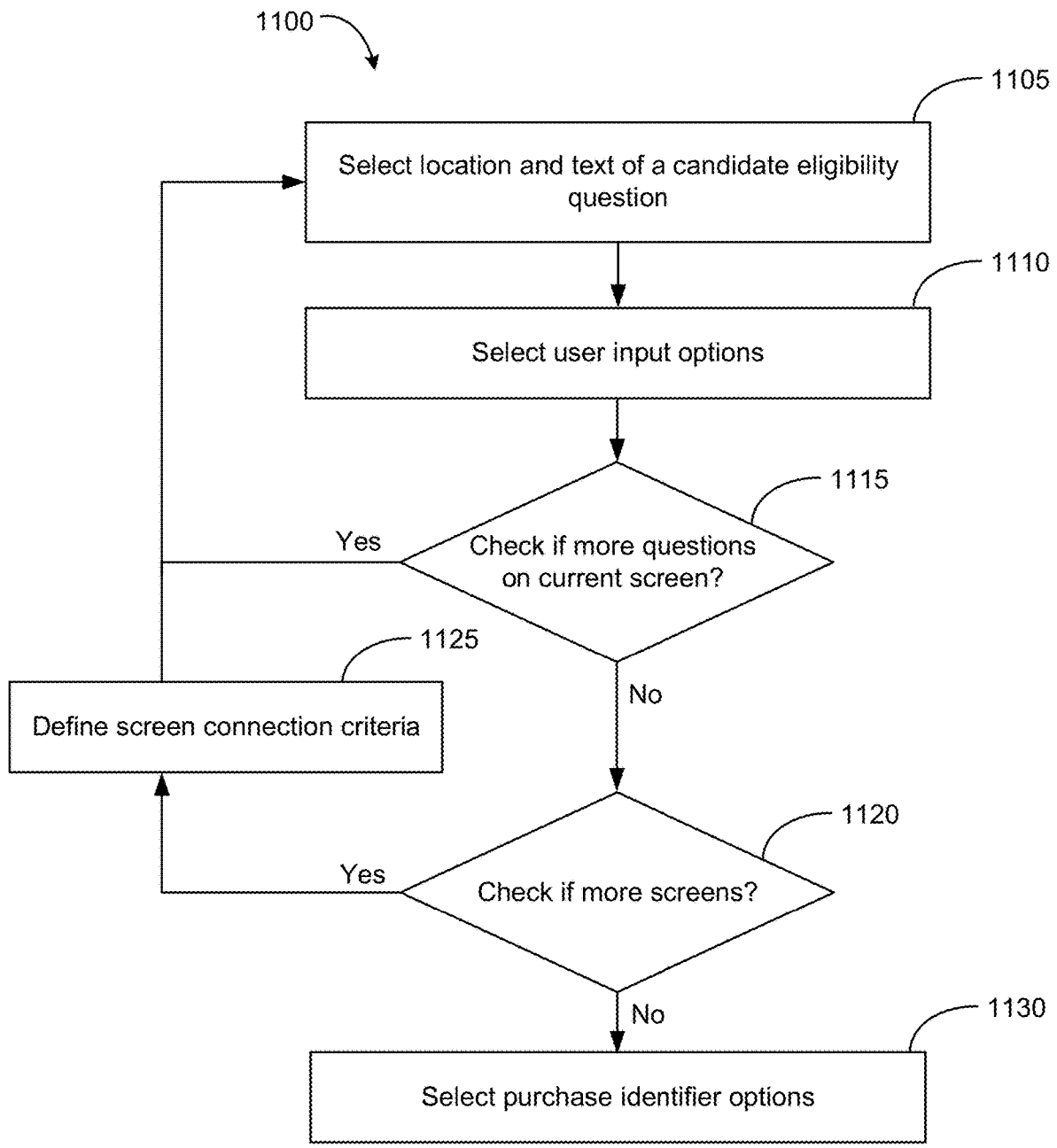
FIG. 11 is a flowchart diagram of an example embodiment of various methods of programming purchase eligibility questions on an interactive product package in accordance with an example embodiment.

Reference is next made to FIG. 11, which is a flowchart diagram of an example embodiment 1100 of various methods of programming purchase eligibility questions on an interactive product package in accordance with an example embodiment. In at least one embodiment, method 1100 can be performed by an administrator or manufacturer of interactive product package 100. However, it should be noted that the method 1100 can be modified for use with other systems or methods.

The method 1100 begins at 1105, where an administrator selects a location and text of a candidate eligibility question. For example, an administrator may select a location and text of candidate eligibility question 445 (as shown in FIG. 4D).

At 1110, the method 1100 moves to select user input options. An administrator may select and place icons representing user input options available to the user. For example, as shown in FIG. 4A, the user input options may include a drop-down menu selection, radio buttons or checkbox selection. In some embodiments, the administrator may select a virtual keyboard as a user input option, as shown in FIG. 4B, and select a location on display device 210 to display the keyboard 435. For embodiments of the interactive product package that include a microphone to receive audio input, the administrator can provide an icon 440, as shown in FIG. 4C, to enable a user to select the audio input option.

At 1115, the method 1100 moves to check if there are more purchase eligibility questions to be displayed on the current screen. If there are more purchase eligibility questions to be displayed, method 1100 moves to perform act 1105 and 1110. For example, after displaying eligibility question 405 and corresponding user input selection 410 (as shown in FIG. 4A), method 1100 may move to perform act 1105 and display the next candidate eligibility question 415. If there are no more purchase eligibility questions to be displayed, method 1115 moves to act 1120.

At 1120, the method 1100 moves to check if there are more screens to be programmed. For example, after programming purchase eligibility questions on a screen as shown in FIG. 4D, the method 1100 moves to program purchase eligibility questions on a screen as shown in FIG. 4E.

If there are more screens to be programmed at 1120, the method moves to act 1125 to define screen connection criteria. For example, the administrator may define the age criteria for user input selection 450 to move method 1100 to define the screen connection criteria from the screen shown in FIG. 4D to the screen shown in FIG. 4E.

If there are no more screens to be programmed at 1120, the method moves to act 1130 to select purchase identifier options. For embodiments where the purchase identifier is a barcode identifier, the administrator can select the position of the barcode identifier on the screen. For example, the barcode purchase identifier 310 is displayed in the lower right-hand corner of display 210 in FIG. 3A. For embodiments where the purchase identifier is a Radio Frequency Identifier (RFID) identifier, the administrator can select the position of the NFC indicia on the screen. For example, NFC indicia 315 is displayed in the lower right-hand corner of display 210 in FIG. 3B.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloads, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims. Also, in the various user interfaces illustrated in the figures, it will be understood that the illustrated user interface text and controls are provided as examples only and are not meant to be limiting. Other suitable user interface elements may be possible.

We claim:

1. An interactive product package system for a product, the interactive product package system for determining a purchase eligibility for a user, comprising:
an input device;
a display device;
a memory, the memory comprising:
at least one purchase eligibility question;
a processor in communication with the input device, the display device, and the memory, the processor configured to:
validate the purchase eligibility of the user, by, for each candidate eligibility question in the at least one purchase eligibility question:
display, at the display device, the candidate eligibility question;
receive, from the input device, a user input selection corresponding to the candidate eligibility question; and
compare the user input selection to a corresponding predetermined value;
if each user input selection matches the corresponding predetermined value:
present a purchase identifier associated with the product.

2. The system of claim 1 further comprising:
a server in network communication with the processor;
wherein the processor is further configured to:
receive, from the server, the at least one purchase eligibility question; and
store, in the memory, the at least one purchase eligibility question.

3. The system of claim 1 further comprising:
a radio-frequency transceiver in communication with the processor;
wherein the purchase identifier is a radio-frequency identifier, and the processor presents the purchase identifier by transmitting the radio-frequency identifier using the radio-frequency transceiver.

4. The system of claim 1 wherein the purchase identifier is a barcode identifier, and the processor presents the purchase identifier by displaying the barcode identifier on the display device.

5. The system of claim 1 further comprising:
a point of sale device; and
the processor further configured to:
store an interaction history comprising one or more user input selections for one or more users in the memory; and
transmit the interaction history to the point of sale device.

6. The system of claim 1 wherein the processor is further configured to:
if the user input selection matches a secondary predetermined value:
display, at the display device, a secondary product recommendation to the user.

7. A method for determining a purchase eligibility of a product for a user, the method comprising:
validating, at a processor, the purchase eligibility of the user based on an eligibility tree, by:
displaying, at a display device, a candidate question to the user, the candidate question belonging to the eligibility tree;
receiving, at an input device, a user input selection corresponding to the candidate question;
comparing, at the processor, the user input selection to an expected answer;
determining, based on the comparing, a next branch of the eligibility tree;
determining, based on the next branch of the eligibility tree, a next candidate question;
if each user input selection matches each expected answer:
presenting a purchase identifier associated with the product.

8. The method of claim 7, wherein the determining, based on the comparing, the next branch of the eligibility tree further comprises:
transmitting, to a server, the user input selection corresponding to the candidate question; and
receiving, from the server, the next branch of the eligibility tree.

9. The method of claim 7, wherein the purchase identifier is a radio-frequency identifier, and the presenting the purchase identifier comprises transmitting the radio-frequency identifier using a radio-frequency transmitter.

10. The method of claim 7, wherein the purchase identifier is a barcode identifier, and the presenting the purchase identifier comprises displaying the barcode identifier on the display device.

11. The method of claim 7, further comprising:
storing, at a memory, an interaction history comprising one or more user input selections for one or more users;
transmitting, to a point of sale device, the interaction history.

12. An interactive product package system, the interactive product package system for determining purchase eligibility of a product for a user, comprising:
- an input device;
- a display device;
- a memory, the memory comprising:
  - an eligibility tree comprising at least one purchase eligibility question;
- a processor in communication with the input device, the display device, and the memory, the processor configured to:
  - validate the purchase eligibility of the user based on the eligibility tree, by:
    - display, at the display device, a candidate question to the user, the candidate question belonging to the eligibility tree;
    - receive, from the input device, a user input selection corresponding to the candidate question;
    - compare the user input selection to an expected answer;
    - determine based on the compare, a next branch of the eligibility tree;
    - determine, based on the next branch of the eligibility tree, a next candidate question;
  - if each user input selection matches each expected answer:
    - presenting a purchase identifier associated with the product.

13. The system of claim 12, further comprising:
- a server;
- wherein the processor is further configured to:
  - transmitting, to the server, the user input selection corresponding to the candidate question; and
  - receiving, from the server, the next branch of the eligibility tree.

14. The system of claim 12, further comprising:
- a radio-frequency transceiver in communication with the processor;
- wherein the purchase identifier is a radio-frequency identifier, and the processor is further configured to present the purchase identifier by transmitting the radio-frequency identifier using the radio-frequency transceiver.

15. The system of claim 12, wherein the purchase identifier is a barcode identifier, and the processor is further configured to present the purchase identifier by displaying the barcode identifier on the display device.

16. The system of claim 12, wherein the processor is further configured to:
- store, at the memory, an interaction history comprising one or more user input selections for one or more users;
- transmit, to a point of sale device, the interaction history.

* * * * *